(12) United States Patent
Bian et al.

(10) Patent No.: US 12,497,048 B2
(45) Date of Patent: Dec. 16, 2025

(54) METHOD FOR VEHICLE CONTROL, NON-TRANSITORY COMPUTER-READABLE STORAGE MEDIUM, AND ELECTRONIC DEVICE

(71) Applicant: BEIJING JINGDONG QIANSHI TECHNOLOGY CO., LTD., Beijing (CN)

(72) Inventors: Xuepeng Bian, Beijing (CN); Liangliang Zhang, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 210 days.

(21) Appl. No.: 18/003,352

(22) PCT Filed: Aug. 31, 2021

(86) PCT No.: PCT/CN2021/115788
§ 371 (c)(1),
(2) Date: Dec. 27, 2022

(87) PCT Pub. No.: WO2022/105361
PCT Pub. Date: May 27, 2022

(65) Prior Publication Data
US 2023/0303085 A1    Sep. 28, 2023

(30) Foreign Application Priority Data
Nov. 19, 2020  (CN) .......................... 202011302765.2

(51) Int. Cl.
*B60W 40/068* (2012.01)
*B60W 50/00* (2006.01)
*B60W 60/00* (2020.01)

(52) U.S. Cl.
CPC ...... *B60W 40/068* (2013.01); *B60W 50/0097* (2013.01); *B60W 2050/0028* (2013.01);
(Continued)

(58) Field of Classification Search
None
See application file for complete search history.

(56) References Cited

U.S. PATENT DOCUMENTS

| | | |
|---|---|---|
| 5,809,445 A | 9/1998 | Yamamoto et al. |
| 2011/0118935 A1 | 5/2011 | Shiozawa et al. |

(Continued)

FOREIGN PATENT DOCUMENTS

| | | |
|---|---|---|
| CN | 105083292 A | 11/2015 |
| CN | 107664551 A | 2/2018 |

(Continued)

OTHER PUBLICATIONS

Rajamani, Rajesh, et al., "Algorithms for Real-Time Estimation of Individual Wheel Tire-Road Friction Coefficients," Dec. 2012, IEEE/ASME Transactions on Mechatronics, vol. 17, No. 6 (Year: 2012).*

(Continued)

*Primary Examiner* — Madison R. Inserra
(74) *Attorney, Agent, or Firm* — Qinghong Xu (57) ABSTRACT

A method for vehicle control, including: obtaining a slip ratio in a current control cycle of a vehicle; calculating a road friction coefficient in the current control cycle of the vehicle by invoking a corresponding calculation strategy according to the slip ratio; and controlling the vehicle in real time by inputting the road friction coefficient into a vehicle control optimization model to obtain a control instruction for the current control cycle of the vehicle.

20 Claims, 3 Drawing Sheets

(52) U.S. Cl.
CPC ....... *B60W 60/001* (2020.02); *B60W 2510/20* (2013.01); *B60W 2520/06* (2013.01); *B60W 2520/10* (2013.01); *B60W 2520/125* (2013.01); *B60W 2520/26* (2013.01); *B60W 2530/201* (2020.02); *B60W 2552/40* (2020.02)

(56) References Cited

U.S. PATENT DOCUMENTS

| | | | |
|---|---|---|---|
| 2017/0151955 A1 | 6/2017 | Offenhaeuser et al. | |
| 2019/0100203 A1* | 4/2019 | Imamura | B60W 30/188 |
| 2019/0176836 A1 | 6/2019 | Yanakiev et al. | |
| 2019/0241176 A1* | 8/2019 | Suzuki | B60L 15/20 |
| 2020/0257291 A1* | 8/2020 | Zhang | B60W 40/101 |

FOREIGN PATENT DOCUMENTS

| | | |
|---|---|---|
| CN | 108725428 A | 11/2018 |
| CN | 109383510 A | 2/2019 |
| CN | 110399664 A | 11/2019 |
| CN | 111369887 A | 7/2020 |
| CN | 111746546 A | 10/2020 |
| JP | 2001133391 A | 5/2001 |
| JP | 2001253334 A | 9/2001 |
| JP | 2007062448 A | 3/2007 |
| JP | 2008143269 A | 6/2008 |
| JP | 2017178236 A | 10/2017 |

OTHER PUBLICATIONS

International Search Report dated Nov. 25, 2021 for PCT International Application No. PCT/CN2021/115788.
The First Office Action dated Nov. 14, 2022 for Chinese Patent Application No. 202011302765.2.
Extended European Search Report dated Jun. 4, 2024 for European Application No. 21893512.0.
1st Office Action dated May 7, 2024 for Japanese Application No. 2023-509829.

* cited by examiner

METHOD FOR VEHICLE CONTROL, NON-TRANSITORY COMPUTER-READABLE STORAGE MEDIUM, AND ELECTRONIC DEVICE

CROSS REFERENCE

The present application is National Stage of International Application No. PCT/CN2021/115788, files on Aug. 31, 2021, and claims priority to Chinese Patent Application No. 202011302765.2 entitled "Method for vehicle control, apparatus, computer-readable storage medium, and electronic device", filed on Nov. 19, 2020, and both the entire contents of which are incorporated herein by reference.

TECHNICAL FIELD

The present disclosure relates to the field of vehicle control, and in particular, to a method for vehicle control, an apparatus for vehicle control, a computer-readable storage medium, and an electronic device.

BACKGROUND

With the development of autonomous driving technology, unmanned vehicle applications are increasingly wider. At present, the control of the unmanned vehicle is mainly divided into an upper-layer controller and a lower-layer controller: the upper-layer controller mainly acts to process the reference trajectory, and generate an accelerator-brake percentage according to the reference trajectory, the vehicle state and the positioning information: the lower-layer controller mainly acts to execute the accelerator-brake instruction and the front wheel steering angle instruction output by the upper-layer controller to drive the vehicle to travel.

SUMMARY

According to one aspect of the embodiments of the present disclosure, there is provided a method for vehicle control, including: obtaining a slip ratio in a current control cycle of a vehicle; calculating a road friction coefficient in the current control cycle of the vehicle by invoking a corresponding calculation strategy according to the slip ratio; and controlling the vehicle in real time by inputting the road friction coefficient into a vehicle control optimization model to obtain a control instruction for the current control cycle of the vehicle.

According to another aspect of the embodiments of the present disclosure, there is provided a non-transitory computer-readable storage medium, storing with a computer program, and when the program is executed by a processor, the method for vehicle control in the above embodiment is implemented.

According to another aspect of the embodiments of the present disclosure, there is provided an electronic device, including: one or more processors; and a storage device, configured to store one or more programs, where, when the one or more programs are executed by the one or more processors, the one or more processors implement the method for vehicle control in the above embodiments.

It should be understood that the above general description and the following detailed description are explanatory and are not intended to limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure. In an obvious way, the drawings in the following description are some embodiments of the present disclosure, and for those of ordinary skill in the art, other drawings may be obtained according to the drawings without involving any inventive effort. In the drawings.

In the drawings, the same or corresponding reference numerals denote the same or corresponding parts.

DETAILED DESCRIPTION

Example embodiments will now be described more fully with reference to the accompanying drawings. Example embodiments, however, can be embodied in many forms and should not be construed as limited to the examples set forth here: rather, these embodiments are provided so that the present disclosure will be more comprehensive and complete, and will fully convey the concept of example embodiments to those skilled in the art.

Furthermore, the described features, structures, or characteristics may be combined in any suitable manner in one or more embodiments. In the following description, many specific details are provided to give a thorough understanding of embodiments of the present disclosure. However, those skilled in the art will appreciate that the technical solutions of the present disclosure may be practiced without one or more of the specific details, or other methods, components, devices, steps, etc. may be employed. In other instances, well-known methods, apparatuses, implementations, or operations are not shown or described in detail to avoid obscuring aspects of the present disclosure.

The block diagrams shown in the drawings are functional entities, and do not necessarily correspond to physically independent entities. That is, these functional entities may be implemented in the form of software, or these functional entities may be implemented in one or more hardware modules or integrated circuits, or these functional entities may be implemented in different networks and/or processor devices and/or microcontroller devices.

The flowchart shown in the drawings is an example, and does not necessarily include all of the content and operations/steps, nor must be performed in the described order. For example, some of the operations/steps may also be decomposed, while the operations/steps may be combined or partially combined, so the actual execution order may be changed according to the actual situation.

An unmanned vehicle trajectory tracking controller plays an important role in an autonomous driving software system, and it can drive a vehicle to travel on a planned trajectory. The current controller may be divided into an upper layer controller and a lower layer controller, where the upper layer controller mainly acts to process a reference trajectory and generate an accelerator-brake percentage according to the reference trajectory, the vehicle state and the positioning information: the lower layer controller includes a wire control system and a vehicle chassis controller, and mainly acts to execute the accelerator-brake instruction and the front wheel steering angle instruction output by the upper layer controller to drive the vehicle to travel. The technology of the lower-layer controller is very mature, and most of the current mainstream research is concentrated in the aspect of the upper-layer controller.

The application of unmanned vehicles in the field of logistics and delivery has a good prospect, such as an intelligent unmanned delivery vehicle. The travelling road condition of the unmanned delivery vehicle is more complex than the travelling road condition of the passenger vehicle, the travelling road of which is generally a sidewalk. During summer and winter, traveling on a surface with accumulated water, a snow surface or an ice surface is a common phenomenon. The travelling speed of the former is higher than the travelling speed of the later. Therefore, how to achieve good travel of an unmanned delivery vehicle on a road surface with a relatively low friction coefficient is an important issue. In addition, although the unmanned vehicle is similar to the wheeled robot, the travelling condition is completely different: the former mostly travels outdoors, the latter mostly travels indoors, and the travelling speed of the former is higher than that of the latter.

At present, there are few control methods for an unmanned vehicle to cope with an ice surface and a snow surface. In the related art, a calibration table method is generally adopted, and when a vehicle travels on roads with different friction coefficients, the system obtains vehicle state information in real time, and performs online updating on the calibration table after multi-dimensional analysis, so that the self-adaptive output of the brake and accelerator is realized. However, the defect of the method is that the data is to be collected offline in advance to generate a calibration table, and meanwhile, due to the fact that the signal-to-noise ratio of the data fed back by the vehicle in real time is poorer, when the calibration table is updated online, noise is inevitably substituted into it, so that the model becomes worse and worse, and the risk that the vehicle is uncontrollable is increased.

In view of the problems existing in the related art, the present disclosure provides a method for vehicle control. By considering the influence of the longitudinal forces of the front wheels and the rear wheels on the friction coefficient under different slip ratios, corresponding longitudinal forces are respectively calculated by using different calculation strategies, so as to obtain a road friction coefficient with higher precision for adaptive control of the vehicle traveling on road surfaces with different friction coefficients.

Figure 1:
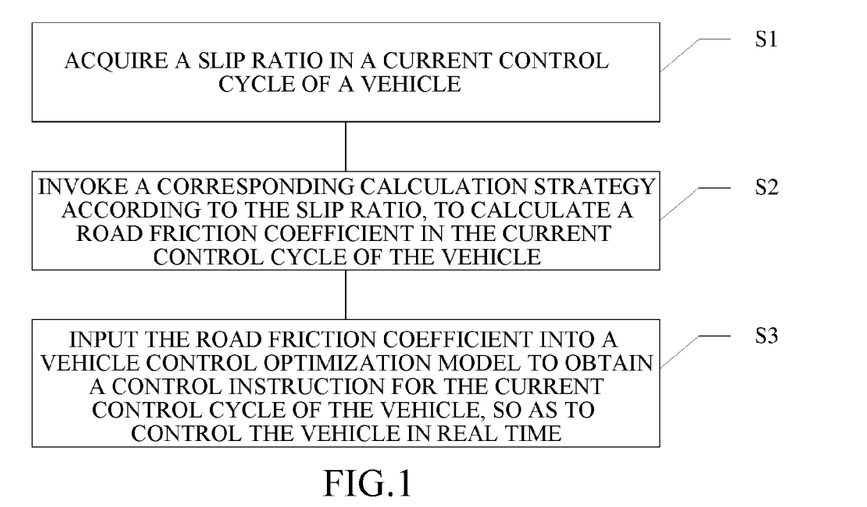
FIG. 1 schematically shows a schematic flowchart of a method for vehicle control according to an embodiment of the present disclosure.

Details of implementation of the technical solutions of the embodiments of the present disclosure are described in detail below:

FIG. 1 schematically shows a schematic flowchart of a method for vehicle control according to an embodiment of the present disclosure. As shown in FIG. 1, the method for vehicle control includes steps S1 to S3:

In step S1, a slip ratio in a current control cycle of a vehicle is obtained:

In step S2, a road friction coefficient of the current control cycle of the vehicle is calculated by invoking a corresponding calculation strategy according to the slip ratio:

In step S3, the vehicle is controlled in real time by inputting the road friction coefficient into a vehicle control optimization model to obtain a control instruction for the current control cycle of the vehicle.

In the technical solution provided in the embodiments of the present disclosure, the corresponding calculation strategy is invoked according to the slip ratio of the current control cycle of the vehicle, so as to calculate the road friction coefficient of the current control cycle of the vehicle, and then the road friction coefficient is input into the vehicle control optimization model to obtain the control instruction of the current control cycle of the vehicle so as to control the vehicle in real time. Different calculation strategies can be adopted to obtain the corresponding road friction coefficient under the conditions of different slip ratios, the parameter identification precision is improved, and then the high-precision road friction coefficient is used for constructing the vehicle control optimization model for prediction to obtain the vehicle control instruction, so that the self-adaptive control precision of vehicle for switching of travelling road surface is improved.

In the following, various steps of the method for vehicle control in the embodiments will be described in more detail with reference to the accompanying drawings and embodiments.

In step S1, a slip ratio of a current control cycle of the vehicle is obtained.

In an embodiment of the present disclosure, the control instruction of the vehicle needs to be updated within the set control cycle, so that the operation state of the vehicle needs to be monitored in real time, and the slip ratio of the current control cycle of the vehicle needs to be obtained. The control cycle is a set value, and may be set according to requirements, such as 20 ms, 50 ms etc. It may also be reasonably set according to the road conditions or external environment of the vehicle travelling. For example, in the same weather environment, different periods can be provided for the vehicle travelling on the asphalt road surface and the cement road surface, or the control cycle of the vehicle traveling in rain and snow weather in winter can be set to be less than the travelling control cycle in sunny days in summer.

Using $\sigma_{xf}$ to represent the front wheel slip ratio of the vehicle and $\sigma_{xr}$ to represent the rear wheel slip ratio of the vehicle, then for calculating the slip ratio of the vehicle, the slip ratios of the front wheel and the rear wheel of the vehicle is first calculated respectively, which may be divided into two cases:

1) During acceleration operation:

$$\sigma_{xf} = \frac{v - v_{fw}}{v} \times 100\% \quad (1)$$

$$\sigma_{xr} = \frac{v - v_{rw}}{v} \times 100\% \quad (2)$$

2) During braking deceleration:

$$\sigma_{xf} = \frac{v_{fw} - v}{v_{fw}} \times 100\% \quad (3)$$

$$\sigma_{xr} = \frac{v_{rw} - v}{v_{rw}} \times 100\% \quad (4)$$

Among them, v represents the longitudinal speed of the vehicle, and may be obtained by a speed sensor: $\sigma_{fw}$ represents the front wheel speed, and $v_{rw}$ represents the rear wheel speed, which may be observed and obtained by the wheel speed meter sensor respectively. Therefore, during acceleration operation, the range of the calculated slip ratio value is [0, 1], and the range of the slip ratio value [−1, 0] during braking deceleration.

When the slip ratio of the whole vehicle is calculated, it can be obtained comprehensively according to the front wheel and the rear wheel, for example by taking average on the slip ratio of the front wheel and the slip ratio of the rear wheel or other value taking methods, which is not specifically limited here. In an embodiment of the present disclosure, the average value of the slip ratio of the front wheel and the rear wheel can be taken as the slip ratio of the whole vehicle.

$$\sigma_x = \frac{\sigma_{xf} + \sigma_{xr}}{2} \qquad (5)$$

Due to the fact that the travelling modes adopted by the vehicle may be different, when the sliding rate is calculated, it is not obtained according to the front wheel or the rear wheel, but is comprehensively considered, so that the identified sliding rate of the vehicle is closer to the actual operation condition of the vehicle.

In step S2, a road friction coefficient in the current control cycle of the vehicle is calculated by invoking corresponding calculation strategy according to the slip ratio.

Figure 2:
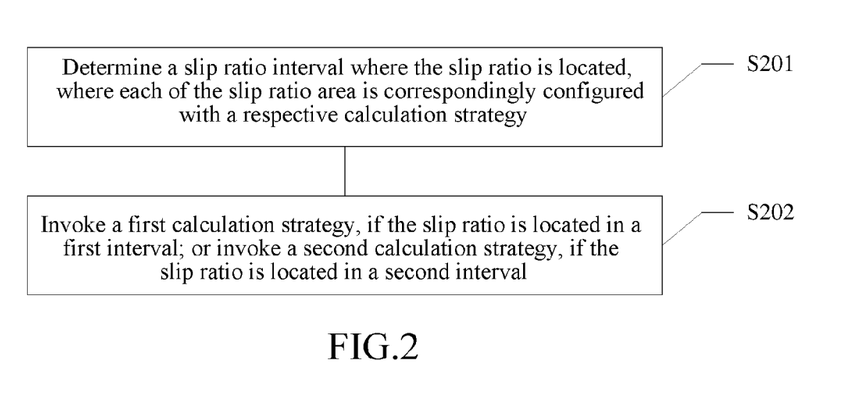
FIG. 2 schematically shows a schematic flowchart of a method for calculating a road friction coefficient according to an embodiment of the present disclosure.

FIG. 2 schematically shows a schematic flowchart of calculating a road friction coefficient according to an embodiment of the present disclosure, including:

In step S201, a slip ratio interval where the slip ratio is located is determined, where each the slip ratio interval is correspondingly configured with a respective calculation strategy:

In step S202, if the slip ratio is located in a first interval, a corresponding first calculation strategy is invoked; or, if the slip ratio is located in a second interval, a corresponding second calculation strategy is invoked.

In step S201, the road friction coefficient is identified by considering both the low slip ratio and the high slip ratio, so that the slip ratio of the vehicle is first divided into corresponding intervals.

It can be seen from the above method that for the slip ratio $\sigma_x \in E$ [−1,1] an interval parameter value $\sigma'_x$ may be set, where $\sigma'_x \in [0,1]$ $[-\sigma'_x,\sigma'_x]$ may be set as the first interval, corresponding to a low slip ratio: $[-1,-\sigma'_x] \cup [\sigma'_x,1]$ may be set as the second interval, corresponding to a high slip ratio.

Among them, the interval parameter value $\sigma_x$ may be given according to an experience value, such as 0.3 and 0.5; or an optimal value may also be given after the simulation model is verified, for example, constructing a Simulink™ simulation, or a Carsim™ simulation experiment.

In step 202, if the calculated vehicle slip ratio is located in the first interval, that is, the low slip ratio, the corresponding first calculation strategy is invoked.

Specifically, the first calculation strategy includes: obtaining a friction influence ratio of front and rear wheels; calculating a longitudinal force of a whole vehicle based on the friction influence ratio of front and rear wheels and a coefficient between a slip slope and road friction; calculating the road friction coefficient based on the longitudinal force of the whole vehicle.

In an embodiment of the present disclosure, when the longitudinal force of the whole vehicle is calculated at a low slip ratio, the front wheel and the rear wheel are separately considered, so that a friction influence ratio of front and rear wheels parameter β is introduced. Taking an unmanned delivery vehicle as an example, the unmanned delivery vehicle is generally driven by a rear wheel, and the front wheel does not provide a travelling force during acceleration, that is, ρ is 0; and during braking, the ρ value is determined by the configuration of the chassis, generally 0.1-0.3.

Then, the longitudinal force of the whole vehicle is calculated based on the friction influence ratio of front and the rear wheels and the coefficient between the sliding slope and the road friction, and according to the relationship between the longitudinal force of the whole vehicle and the slip ratio of the wheels:

$$F_{x1} = k\mu(\rho F_{zf}\sigma_{xf} + F_{zr}\sigma_{xr}) \qquad (6)$$

Among them, $F_{x1}$ represents the longitudinal force of the whole vehicle with the slip ratio located in the first interval, k represents the relationship between the slip slope of the rear wheel of the vehicle and the road friction coefficient, μ represents the road friction coefficient, ρ represents the friction influence ratio of front and rear wheels, $F_{zf}$ and $F_{zr}$ respectively represent the normal force of the front wheel and the rear wheel, which can be obtained by the following method:

$$F_{zf} = \frac{mgL_r - ma_xh - Dv^2h_a}{L} \qquad (7)$$

$$F_{zr} = \frac{mgL_f + ma_xh + Dv^2h_a}{L} \qquad (8)$$

Where, m represents vehicle mass, g represents gravity acceleration, $L_r$ and $L_f$, respectively represent the distances from the center of mass of the vehicle to the front axle and the rear axle, L represents the wheelbase of the vehicle, $x_x$ x represents the longitudinal acceleration of the vehicle, h represents the centroid height of the vehicle, D represents the air resistance constant, and $h_a$ represents the height of the front face of the vehicle.

In the case of low slip ratio, considering that the front and rear wheels may have different travelling conditions when the unmanned vehicle is in different travelling modes, the friction influence ratio of front and rear wheels is introduced when the longitudinal force of the whole vehicle is calculated. The influence of the slip ratio of the front and rear wheels on the longitudinal force of the whole vehicle is considered separately, so that the calculated longitudinal force of the whole vehicle better conforms to the actual operation condition of the vehicle, the accuracy of the longitudinal force value is higher, and the applicability to different unmanned vehicles is also higher.

In step 202, if the calculated vehicle slip is located in the second interval, that is, the low slip ratio, the corresponding second calculation strategy is invoked.

Specifically, the second calculation strategy includes: calculating the longitudinal force of the whole vehicle normalized by the front and rear wheels; and calculating the road friction coefficient based on the longitudinal force of the whole vehicle.

Under a high slip ratio, or in case of emergency braking, the slip slope value has a non-linear relationship with the road friction coefficient μ, so the method in the case of low slip ratio will not be applied. Therefore, the relationship between the longitudinal force of the whole vehicle and the slip ratio of the wheel may be described as follows:

$$F_{x2} = F_z^T \mu \qquad (9)$$

Where, $F_{x2}$ represents the longitudinal force of the whole vehicle with the slip ratio located in the second interval, $F_z$ represents the normal force by the normalization of the front and rear wheels, and μ represents the road friction coefficient.

$F_z$ can be obtained through the following method:

$$F_z = \frac{mgL - ma_x h - Dv^2 h_a}{L} \qquad (10)$$

In an embodiment of the present disclosure, when the longitudinal force of the whole vehicle is calculated, the longitudinal force of the whole vehicle can be calculated by using a magic formula tire model, that is, $$F_{x2} = (F_{zf}\sin[C \arctan(B\sigma_{xf})] + F_{zr}\sin[C \arctan(B\sigma_{xf})])^T \mu \qquad (11)$$

Where, $F_{x2}$ represents the longitudinal force of the whole vehicle with the slip ratio located in the second interval, $F_{zf}$ and $F_{zr}$ respectively represent the normal force of the front wheel and the normal force of the rear wheel, $\sigma_{xf}$ and $\sigma_{xr}$ respectively represent the slip ratios of the front wheel and the rear wheel of the vehicle, and B and C respectively represent tire model parameters with values of 14 and 1.3 respectively.

The functions of the final application standards under the two calculation strategies are expressed as follows:

$$\begin{cases} F_{x1} = k(\rho F_{zf}\sigma_{xf} + F_{zr}\sigma_{xr})^T \mu & \sigma_x \in [-\sigma_x', \sigma_x'] \\ F_{x2} = F_z^T \mu & \sigma_x \in [-1, -\sigma_x'] \cup [\sigma_x', 1] \end{cases} \qquad (12)$$

In an embodiment of the present disclosure, the calculating the road friction coefficient based on the longitudinal force of the whole vehicle adopts a least square method with a forgetting factor for calculation, and the specific steps include: determining a coefficient input value according to a invoked calculation strategy; obtaining a parameter of a current control cycle of the vehicle, and calculating an output value; and calculating a road friction parameter to be estimated by adopting a least square method with a forgetting factor according to the input value and the output value.

The formula (12) is represented as a parameter identification standard form:

$$y(t) = \varphi^T(t)\theta(t) + e(t) \qquad (13)$$

Where, y(t) represents the longitudinal force of the whole vehicle $F_x$; φ(t) represents the input value, the values of which are $k(\rho F_{zf}\sigma_{xf} + F_{zr}\sigma_{xr})$ and $F_z$ respectively in case of low slip ratio and high slip ratio; if a magic formula tire model is employed, then the input value is $F_{zf}\sin[C \arctan(B\sigma_{xf})] + F_{zr}\sin[C \arctan(B\sigma_{xf})]$; θ(t) represents the road friction parameter μ to be estimated; e(t) represents the error of the output value and the estimated value.

Then, parameter identification is performed by using a least square method with a forgetting factor, and the steps are as follows:

1) obtaining the parameter of the current control cycle of the vehicle, obtaining the longitudinal force of the whole vehicle $F_x$ at the moment k as the output value y(k), and calculating the input value based on the above-mentioned method.

2) calculating the error e(k) of the output value and the estimated value:

$$e(k) = y(k) - \varphi^T(k)\theta_{k-1} \qquad (14)$$

Where, $\theta_{k-1}$ is the parameter identification result at the moment k−1, that is, the road friction parameter of the previous control cycle, which is a known quantity.

3) calculating a gain matrix K:

$$K_k = \frac{P_{k-1}\varphi_k}{\lambda + \varphi_k^T P_{k-1}\varphi_k} \qquad (15)$$

Where, P is an intermediate variable matrix, and before the algorithm is started, an initial value needs to be assigned to the matrix P. The P matrix at K moment can be calculated using the method as follows:

$$P_k = \frac{1}{\lambda}\left[I - \varphi_k \cdot K_k^T\right] \cdot P_{k-1} \qquad (16)$$

Where, I represents the moment of inertia of the vehicle around the Z axis; λ represents the forgetting factor; the larger the value is, the slower the convergence speed is, so that the parameter updating is slower, and the parameter updating delay is larger when the vehicle is switched on roads with different friction coefficients; and the smaller the value is, the faster the convergence speed is, but anti-interference capability of the parameter is weakened, so that the noise data may be coupled, and then the parameter updating is inaccurate. Therefore, there is a need to achieve a balance between fast response and parameter stability. In one embodiment of the present disclosure, λ is taken a value of 0.95.

4) calculating a road friction parameter theta θ(t) to be estimated:

$$\theta_k = \theta_{k-1} + K_k\left[y_k - \varphi_k^T \theta_{k-1}\right] \qquad (17)$$

Where, $\theta_k$ is the road friction parameter μ to be identified at the current moment k.

In an embodiment of the present disclosure, the slip ratio interval may also be more that one interval, for example, a third interval may be added, where the third interval includes a critical value between the first interval and the second interval. For example, setting $\sigma_x'=0.3$, the first interval is [−0.3, 0.3], the second interval is [−1,−0.3]∪[0.3, 1], and the third interval is [−0.4,−0.2]∪[0.2, 0.4]. When the slip ratio is in the third interval, the smaller value calculated by the first calculation strategy and the second calculation strategy may be taken as the road friction parameter. According to the vehicle operation properties corresponding to the different values of the slip ratio, the corresponding calculation strategy is designed to obtain the road friction parameters by considering the middle intervals of the high slip ratio and the low slip ratio, so that the precision of the road friction parameters is further improved.

In an embodiment of the present disclosure, after estimating the road friction parameter, a verification step may also be added to correct the calculation of the parameter. For example, using the preliminarily estimated road friction parameter as an observation variable and parameters corresponding k, μ and ρ as extended states to establish a state equation and an observation equation. A standard filtering recursion process is established a by using an extended Kalman filtering algorithm, and the final road friction parameter is calculated by filtering the signal noise, so that the road friction parameter calculation is more accurate.

Since the unmanned vehicle can travel on different road surfaces, such as a common road, an ice surface, a snow surface and the like, the slip ratio of the vehicle is divided into two conditions of low slip ratio and high slip ratio for parameter identification, respectively, so that the identified road friction coefficient better conforms to the actual travelling situation of the vehicle.

In step S3, the road friction coefficient is input into a vehicle control optimization model to obtain a control instruction for the current control cycle of the vehicle, so as to control the vehicle in real time.

In an embodiment of the present disclosure, step S3 further includes step S300 of pre-constructing the vehicle control optimization model, including: configuring decision variables for the vehicle control optimization model, including state variables and control variables; and establishing a loss function as an objective function, and setting constraint conditions to construct a vehicle control optimization model, where the constraint conditions are related to the road friction coefficient.

First, the decision variables of the vehicle control optimization model are determined as [x y θ v α $\dot{\theta}$ F δ], where, the decision variable includes six state variables, which are vehicle position coordinates X and Y, heading angle θ, longitudinal linear speed v, tire slip angle α, and heading angular acceleration $\dot{\theta}$ in a global coordinate system, respectively; and two control variables of the longitudinal force of the whole vehicle F and the front wheel angle δ, respectively.

Then, a vehicle control optimization model is established, that is, the optimal control solution is obtained by means of rolling optimization, and on the basis of the constraint, one or some performance indexes reach the optimum to achieve control effect.

The objective function of the optimization model is established, the general form of the objective function may be expressed as a quadratic function of the state and the control input, and in order to effectively suppress the control variable, the control variable is also added to the objective function, represented as the following:

$$J = w_l \sum_{i=0}^{N_p} e_l^2 + w_s \sum_{i=0}^{N_p} e_s^2 + w_\theta \sum_{i=0}^{N_p} e_\theta^2 + \quad (18)$$

-continued
$$w_v \sum_{i=0}^{N_p} e_v^2 + w_\alpha \sum_{i=0}^{N_p} e_\alpha^2 + w_{\dot{\theta}} \sum_{i=0}^{N_p} e_{\dot{\theta}}^2 + w_F \sum_{i=0}^{N_c} e_F^2 + w_\delta \sum_{i=0}^{N_c} e_\delta^2$$

Where, J is a loss function, $N_p$ and $N_c$ are respectively a prediction time domain and a control time domain, $w_l$, $w_s$, $w_\theta$, $w_v$, $w_\alpha$, $w_{\dot{\theta}}$, $w_F$ and $w_\delta$ represents the weight of each optimization target respectively, $e_l$, $e_s$, $e_\theta$, $e_v$, $e_\alpha$, $e_{\dot{\theta}}$, $e_F$ and $e_\delta$ represents each error value of the optimized target respectively.

After the loss function is constructed as the objective function, constraint conditions need to be set, and the constraint conditions include dynamics model constraint, starting point constraint, front wheel steering angle, front wheel steering angle increment constraint, longitudinal force and longitudinal force increment constraint, speed and speed increment constraint. The specific content is as follows:

1) Dynamic Model Constraint:

In an embodiment of the present disclosure, a predicted dynamic model equation of the state variable for a reference trajectory point of the vehicle is configured as the dynamic model constraint condition.

A simplified model of the dynamic model is established as follows:

$$\dot{X} = AX + BU + C \quad (19)$$

where X is the state variable and is selected as X=[x y θ v α $\dot{\theta}$]$^T$. U is the control variable, and is selected as U=[F δ]$^T$. A, B, and C are matrix parameters of the dynamic model.

For the formula (19), a Taylor series formula is used to expand at any reference trajectory point to obtain a discretized dynamic model as follows:

$$x_{k+1} = \quad (20)$$
$$x_k + v_k T\cos(\theta + \alpha) - vT\sin(\theta + \alpha) \cdot (\theta_k + \alpha_k) + vT\sin(\theta + \alpha) \cdot (\theta + \alpha)$$

$$y_{k+1} = \quad (21)$$
$$y_k + v_k T\sin(\theta + \alpha) + vT\cos(\theta + \alpha) \cdot (\theta_k + \alpha_k) - vT\cos(\theta + \alpha) \cdot (\theta + \alpha)$$

$$\theta_{k+1} = \theta_k + \dot{\theta}_k \quad (22)$$

$$v_{k+1} = v_k \left(1 - \frac{F_{drag} + F_{fric}}{mv}\right) + \alpha_k C_f \frac{\sin(\delta - \alpha) - \sin\alpha}{m} + \quad (23)$$
$$\dot{\theta}_k C_f \frac{a \cdot \sin(\delta - \alpha) + b \cdot \sin\alpha}{mv} + F_k \frac{\cos\alpha}{m} + C_f \delta_k \frac{\sin(\delta - \alpha)}{m}$$

$$\alpha_{k+1} = \alpha_k \left(1 - C_f \frac{\cos(\alpha - \delta) + \cos\alpha}{mv}\right) + \quad (24)$$
$$\dot{\theta}_k C_f \frac{a \cdot \cos(\alpha - \delta) + b \cdot \cos\alpha}{mv^2} - \dot{\theta}_k - F_k \frac{\sin\alpha}{mv} + C_f \delta_k \frac{\cos(\alpha - \delta)}{mv}$$

$$\dot{\theta}_{k+1} = \dot{\theta}_k \left(1 - C_f \frac{a^2\cos(\delta) + b^2}{Iv}\right) + \alpha_k C_f \frac{b - a \cdot \cos(\delta)}{I} + \frac{\delta_k C_f a\cos(\delta)}{I} \quad (25)$$

where the subscript k represents the value of the parameter at the current moment k, k+1 represents the value at the predicted moment k+1, the parameter without the subscript represents the parameter value at the reference trajectory point, T represents the control cycle, $C_f$ represents the lateral deviation stiffness of the vehicle tire, a and b respectively represent the distance from the front and rear axles to the vehicle center, m represents the vehicle mass, I represents the rotational inertia of the vehicle around the z axis, $F_{drag}$ represents the air resistance, and $F_{fric}$ represents the road friction resistance.

The method for calculating the air resistance $F_{drag}$ is as follows:

$$F_{drag} = Dv^2 \qquad (26)$$

where D is an air resistance constant:

The method for calculating the road friction resistance FRIC is as follows:

$$F_{fric} = \mu mg \qquad (27)$$

where μ represents the road friction coefficient, that is, the road friction coefficient obtained based on the above-mentioned method.

2) Starting Point Constraint:

In an embodiment of the present disclosure, a state variable initial value at a starting point of the vehicle is configured as the starting point constraint condition.

The starting point constraint indicates that there is a need to start from the current state when performing vehicle state prediction, the constraint conditions being as follows:

$$x(0) = x(\text{vehicle}) \qquad (28)$$
$$y(0) = y(\text{vehicle}) \qquad (29)$$
$$\theta(0) = \theta(\text{vehicle}) \qquad (30)$$
$$v(0) = v(\text{vehicle}) \qquad (31)$$
$$a(0) = a(\text{vehicle}) \qquad (32)$$
$$\dot{\theta}(0) = \dot{\theta}(\text{vehicle}) \qquad (33)$$

x(0), y(0), θ(0), v(0) α(0) and $\dot{\theta}$(0) represent the coordinates, the heading angle, the speed, the slip angle, the initial value of the heading angular acceleration of the vehicle at initial position respectively: x(vehicle), y(vehicle), θ(vehicle), v(vehicle), α(vehicle) and $\dot{\theta}$(vehicle) represent the coordinates, the heading angle, the speed, the slip angle, and the heading angular acceleration of the vehicle of the vehicle at current position respectively.

3) Front Wheel Steering Angle and Front Wheel Steering Angle Increment Constraint:

In an embodiment of the present disclosure, a front wheel steering angle constraint value range determined based on a maximum transverse acceleration value, a vehicle wheelbase, a longitudinal linear speed and a maximum and minimum front wheel steering angle of the vehicle is configured as the front wheel steering angle constraint condition; and a front wheel steering angle increment constraint value range determined based on the maximum and minimum front wheel steering angle increments of the vehicle is configured as the front wheel steering angle increment constraint condition.

In order to prevent rollover of the vehicle during high-speed detour or turning, the steering angle is constrained the present disclosure. The constraint range is changed along with the change of the vehicle speed:

$$\nabla \delta = \arctan\left(\frac{L \times acc_{lat}}{v_x^2}\right) \qquad (34)$$

Where, $acc_{lat}$ is the maximum transverse acceleration value, L represents the vehicle wheelbase, and v represents the longitudinal linear speed.

The front wheel steering angle constraint is set as follows:

$$\delta_{min} < \delta_k < \delta_{max} \qquad (35)$$

where $\delta_k$ represents the steering angle at the moment k, $\delta_{min}$ represents the final minimum steering angle constraint value $\delta_{min}=\max(-\nabla,\delta(\min))$, $\delta_{max}$ represents the final maximum angle constraint value $\delta_{max}=\min(\nabla\delta,\delta(\max))$, δ(max) and δ(min) represent the maximum and minimum steering angles that the vehicle actually can support respectively.

Meanwhile, the front wheel steering angle increment constraint is set as follows:

$$\Delta\delta_{min} < \delta_k - \delta_{k-1} < \Delta\delta_{max} \qquad (36)$$

where $\delta_{k-1}$ represents the steering angle at the moment k−1, $\Delta\delta_{min}$ and $\Delta\delta_{max}$ represents the minimum and maximum steering angle increment constraint values, respectively.

4) Longitudinal Force and Longitudinal Force Increment Constraint:

In an embodiment of the present disclosure, a longitudinal force constraint value range determined based on the maximum and minimum longitudinal forces of the vehicle is configured as the longitudinal force constraint condition; and a longitudinal force increment constraint value range determined based on the maximum and minimum longitudinal force increments of the vehicle is configured as the longitudinal force increment constraint condition.

The longitudinal force constraint refers to the actual supportable longitudinal force value of the vehicle, and the constraint condition is set as follows:

$$\Delta F_{min} < F_k - F_{k-1} < \Delta F_{max} \qquad (38)$$

where $F_{k-1}$ represents the longitudinal force of the whole vehicle at the moment k, $\Delta F_{min}$ and $\Delta F_{max}$ represent the minimum and maximum longitudinal force constraint values, respectively.

At the same time, a longitudinal force increment constraint is set as follows:

$$\Delta F_{min} < F_k - F_{k-1} < \Delta F_{max} \qquad (38)$$

where $F_{k-1}$ represents the longitudinal force of the whole vehicle at the moment k−1, $\Delta F_{min}$ and $\Delta F_{max}$ respectively represent the minimum and maximum longitudinal force increment constraint values.

5) Speed and Speed Increment Constraint:

In an embodiment of the present disclosure, a speed constraint value range determined based on the maximum and minimum longitudinal linear speeds of the vehicle is configured as the speed constraint condition; and a speed constraint increment value range determined based on the maximum and minimum longitudinal linear speed increments of the vehicle is configured as the speed increment constraint condition.

In order to prevent vehicle overspeed, it is necessary to constrain the vehicle speed, the constraint setting is based on the maximum support speed of the vehicle and the maximum speed supported by the autonomous driving system, and the constraint condition is as follows:

$$v_{min} < v_k < v_{max} \quad (39)$$

where $v_k$ represents the longitudinal linear speed at the moment k, min and max represent the minimum and maximum longitudinal linear speed, respectively.

The speed increment constraint is obtained by acceleration, and the speed increment constraint is set as follows:

$$a_{min} \cdot T < v_k - v_{k-1} < a_{max} \cdot T \quad (40)$$

where $v_{k-1}$ represents the longitudinal linear speed at the moment k−1, T represents the control cycle, $a_{min}$ and $a_{max}$ represent the maximum deceleration and the maximum acceleration supported by the vehicle, respectively.

When the vehicle control optimization model is constructed, the step sequences of establishing the objective function and setting the constraint conditions are not limited, and the constraint conditions may be set first and then the objective function may be established.

The real-time change of the tire slip angle and the longitudinal slip ratio can seriously affect the travelling effect of the unmanned vehicle, as it travels switching from the road surfaces with different friction coefficients. Therefore, for the tire slip angle, it is considered that the tire slip angle is used as the state variable tire slip angle α input by the vehicle control optimization model; for the longitudinal slip ratio, the road friction coefficient is calculated by adopting different calculation strategies under different longitudinal slip ratios for updating the dynamic model to perform predict; and then based on this model, the rolling optimization model is designed to improve the accuracy of model prediction, the self-adaptive control effect when the vehicle is switched from a common road to the ice surface or the snow surface is achieved, and the control effect of the vehicle during high-speed travelling is improved.

At the same time, in order to improve the stability of longitudinal travelling of the vehicle, longitudinal force and longitudinal force increment constraint, speed and speed increment constraint are added: in order to enhance the lateral stability of the vehicle, a front wheel steering angle constraint is added.

When the vehicle control optimization model is designed, necessary state variables such as vehicle coordinates and heading angle are selected, and the tire slip angle with a relatively higher influence degree on the travelling effect is added, so that it can be ensured that the tedious and slow calculation process due to excessive parameters is avoided while the control precision requirement is met.

Figure 3:
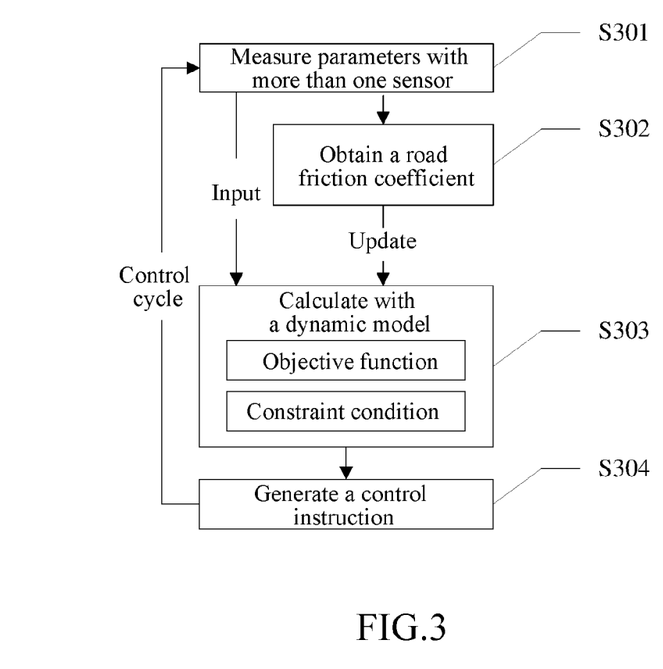
FIG. 3 schematically shows a schematic flowchart of a method for generating a vehicle control instruction according to an embodiment of the present disclosure.

FIG. 3 schematically shows a schematic diagram of a method for generating a vehicle control instruction according to an embodiment of the present disclosure, including:

In Step S301, parameter values of the state variables of a current control cycle are obtained and input into the vehicle control optimization model.

The state variables of the current control cycle include vehicle position coordinates x, y, heading angle θ, longitudinal linear speed v, tire slip angle α, and heading angular acceleration $\ddot{\theta}$. Where, the vehicle position coordinates x, y may be acquired by a GPS of the vehicle; and the heading angle θ and a heading angular acceleration $\ddot{\theta}$ can be calculated from the lightning point cloud diagram of the vehicle; the longitudinal linear speed v may be obtained by a wheel speed meter; and the tire slip angle α may be determined by a parameter value of the previous control cycle.

In s step S302, the model is updated based on the road friction coefficient.

Based on the above method, the obtained road friction coefficient μ is brought into $F_{fric}$ to calculate the road friction resistance, and then updating the objective function and the constraint conditions in the model are optimized.

In step S303, parameter values of the control variables are obtained by solving based on the objective function and the constraint conditions in the vehicle control optimization model.

Specifically, the input of the vehicle control optimization model is a state variable, and the output is a control variable. The obtained parameter values of the state variables of the current control cycle are inputted into the updated optimization model, where the output control variables include the longitudinal force of the whole vehicle F and the front wheel angle δ.

In step S304, a control instruction is generated based on the parameter values of the control variables.

The longitudinal force of the whole vehicle F output by the optimization model is converted into a torque to be input to the wire control system, and meanwhile, a front wheel steering angle instruction is generated from the front wheel steering angle delta δ for vehicle control.

By configuring the longitudinal force of the whole vehicle as the output variable, the vehicle control optimization model directly outputs the torque instruction, so that the calibration step of converting the acceleration instruction into the torque in the traditional method is omitted, the delay of the system is reduced while the system is simplified, and the real-time performance of the control effect is enhanced.

In one embodiment of the present disclosure, after the control instruction is calculated, a link of control instruction verification may be added, and when the instruction verification is passed, the control instruction is then input into the controller for controlling the vehicle. The travelling environment information of the vehicle is collected in advance to generate a virtual environment for vehicle operation, which is used for monitoring the travelling condition of the vehicle in real time: after the control instruction is generated, instruction operation simulation is carried out in advance in the virtual environment; if the simulation is passed, the control instruction is used for control, and if the simulation indicates that vehicle operates abnormally after the operating the instruction, the control instruction is not used, and emergency braking is performed.

Among them, the control instruction verification may be selectively turned on according to the travelling situation. For example, when the vehicle travels on a wet skid road surface in rainy and snowy weather, or there is travelling road condition of an uneven road surface or a gradient in the travelling route, or if the output control instruction data is abnormal, the link of instruction verification is then selected to be turned on. The control instruction obtained by calculation is verified, so that the correctness of the vehicle adaptive instruction can be further ensured, and the vehicle control error caused by calculation errors is avoided.

In an embodiment of the present disclosure, an obstacle detection device may also be provided at the front end or other part of the unmanned vehicle, and when it is detected that the distance between the obstacle and the vehicle is less than a preset distance, an obstacle braking instruction is triggered, the braking instruction having the highest priority, and the vehicle may be braked emergently. By setting the automatic triggering of the obstacle braking instruction, the collision or damage of the vehicle caused by sudden situations of sudden appearing of animals, pedestrians and the article can be avoided, and unnecessary loss is reduced. It should be noted that although the various steps of the methods in the present disclosure are described in a particular order in the drawings, this does not require or imply that these steps must be performed in that particular order, or that all of the illustrated steps must be performed to achieve the desired results. Additionally or alternatively, certain steps may be omitted, more than one step may be combined into one step to be performed, and/or one step may be decomposed into more than one step for execution, etc.

Figure 4:
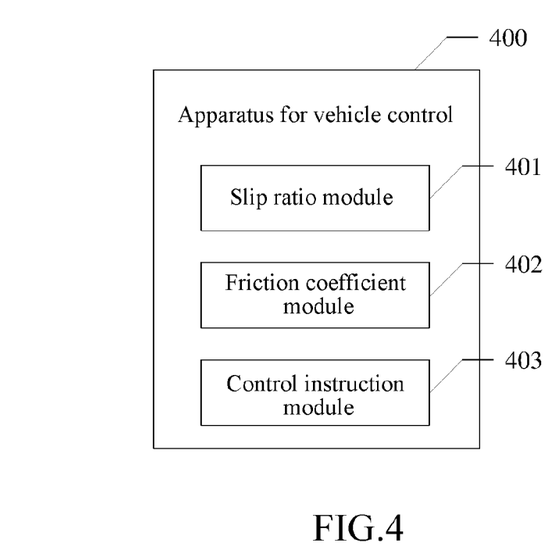
FIG. 4 schematically shows a schematic composition diagram of an apparatus for vehicle control according to an embodiment of the present disclosure.

FIG. 4 schematically shows a schematic composition diagram of an apparatus for vehicle control according to an embodiment of the present disclosure. As shown in FIG. 4, the apparatus for vehicle control may include a slip ratio module 401, a friction coefficient module 402, and a control instruction module 403.

The slip ratio module 401 is configured to obtain a slip ratio in a current control cycle of the vehicle:

The friction coefficient module 402 is configured to calculate a road friction coefficient in the current control cycle of the vehicle by invoking a corresponding calculation strategy according to the slip ratio:

The control instruction module 403 is configured to control the vehicle in real time by inputting the road friction coefficient into a vehicle control optimization model to obtaining a control instruction for the current control cycle of the vehicle.

According to an embodiment of the present disclosure, the friction coefficient module 402 includes a slip ratio interval unit and a calculation strategy unit (not shown), and the slip ratio interval unit is configured to determine a slip ratio interval where the slip ratio is located, where each slip ratio interval is correspondingly configured with a respective calculation strategy: the calculation strategy unit is used for invoking a corresponding first calculation strategy if the slip ratio is located in a first interval, or invoking a corresponding second calculation strategy if the slip ratio is located in a second interval.

According to an embodiment of the present disclosure, the calculation strategy unit includes a first calculation strategy unit configured to: obtain a friction influence ratio of front and rear wheels; calculate a longitudinal force of the whole vehicle based on the friction influence ratio of front and rear wheels and the coefficient between the slip slope and the road friction; and calculate the road friction coefficient based on the longitudinal force of the whole vehicle.

According to an embodiment of the present disclosure, the calculation strategy unit further includes a second calculation strategy unit, which is configured to calculate the longitudinal force of the whole vehicle normalized by the front wheel and the rear wheels; and calculate the road friction coefficient based on the longitudinal force of the whole vehicle.

According to an embodiment of the present disclosure, the road friction coefficient is calculated based on the longitudinal force of the whole vehicle by using a least square method with a forgetting factor.

According to an embodiment of the present disclosure, the apparatus for vehicle control further includes a vehicle control optimization model construction module (not shown), which is configured to: configure decision variables of the vehicle control optimization model, including state variables and control variables; establish a loss function as an objective function, and set constraint conditions to construct the vehicle control optimization model, where the constraint conditions are related to the road friction coefficient.

According to an embodiment of the present disclosure, the state variables include a vehicle position coordinate, a heading angle, a longitudinal linear speed, a tire slip angle, and a heading angular acceleration; and the control variables include a vehicle longitudinal force and a front wheel steering angle.

According to an embodiment of the present disclosure, the constraint conditions include: a dynamic model constraint, a starting point constraint, a front wheel steering angle, a front wheel steering angle increment constraint, a longitudinal force and longitudinal force increment constraint, a speed and a speed increment constraint.

According to an embodiment of the present disclosure, the control instruction module 403 includes: an input unit, an output unit, and a control instruction unit (not shown), where the input unit is configured to obtain parameter values of the state variables of a current control cycle for inputting into the vehicle control optimization model, and update the model based on the road friction coefficient: the output unit is configured to obtain parameter values of the control variables by solving based on an objective function and constraint conditions in the vehicle control optimization model; and the control instruction unit is configured to generate a control instruction based on the parameter values of the control variables.

The specific details of each module in the apparatus for vehicle control 400 are described in detail in the corresponding method for vehicle control, and therefore, details are not described here again.

It should be noted that although several modules or units of an apparatus for action execution are mentioned in the above detailed description, such division is not mandatory. Indeed, according to embodiments of the present disclosure, the features and functions of the two or more modules or units described above may be embodied in one module or unit. Conversely, the features and functions of one module or unit described above may be further divided into a plurality of modules or units.

Figure 5:
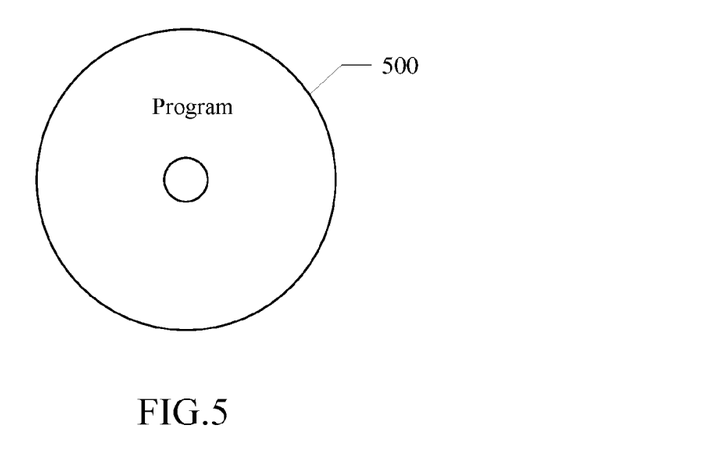
FIG. 5 schematically shows a schematic diagram of a computer-readable storage medium according to an embodiment of the present disclosure.

In an embodiment of the present disclosure, there is further provided a storage medium capable of implementing the above method. FIG. 5 schematically shows a schematic diagram of a computer-readable storage medium according to an embodiment of the present disclosure. As shown in FIG. 5, a program product 500 for implementing the foregoing method is described in accordance with an embodiment of the present disclosure, which may employ a portable compact disk read-only memory (CD-ROM) and includes program code, and may be run on a terminal device, such as a mobile phone. However, the program product of the present disclosure is not limited this, and in the context, the readable storage medium may be any tangible medium containing or storing a program that may be used by or in connection with an instruction execution system, apparatus, or device.

Figure 6:
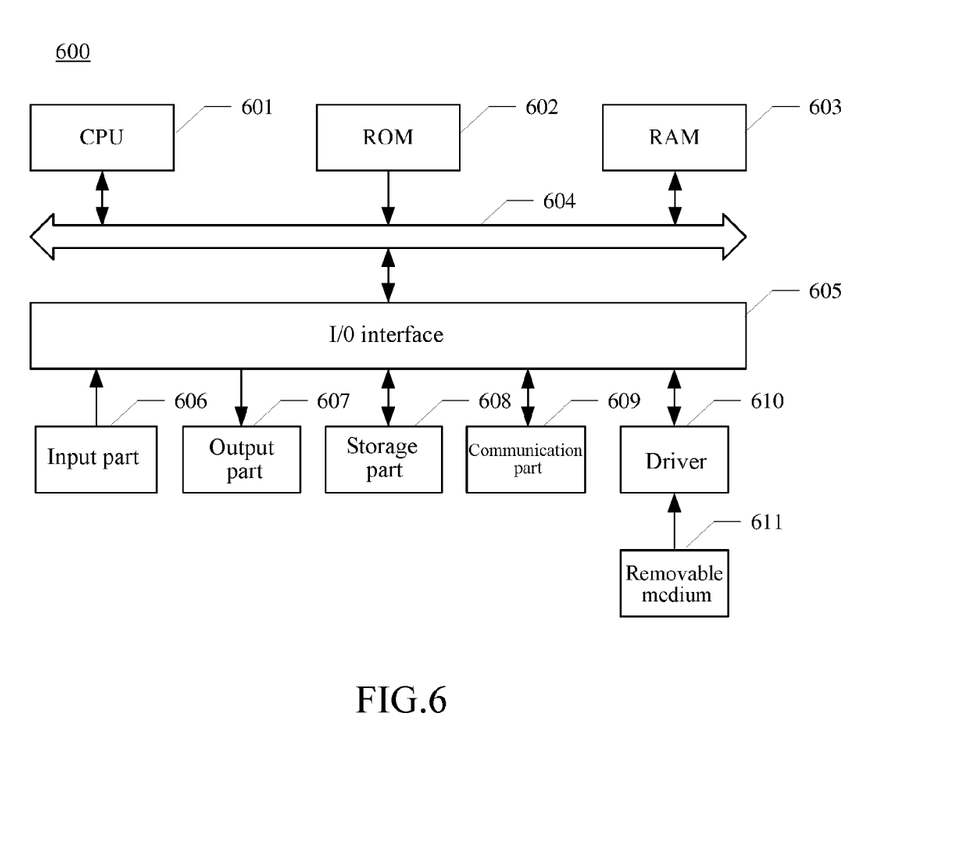
FIG. 6 schematically shows a schematic structural diagram of a computer system of an electronic device according to an embodiment of the present disclosure.

In an embodiment of the present disclosure, there is further provided an electronic device capable of implementing the above method. FIG. 6 schematically shows a schematic structural diagram of a computer system of an electronic device according to an embodiment of the present disclosure.

It should be noted that the computer system 600 of the electronic device shown in FIG. 6 is an example, and should not bring any limitation to the functions and use ranges of the embodiments of the present disclosure.

As shown in FIG. 6, the computer system 600 includes a central processing unit (CPU) 601, which may perform various appropriate actions and processing according to a program stored in a read-only memory (ROM) 602 or a program loaded into a random access memory (RAM) 603 from a storage part 608. In the RAM 603, various programs and data required for system operation are also stored. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse, etc.: an output part 607 including a cathode ray tube (CRT), a liquid crystal display (LCD), and the like: a storage part 608 including a hard disk or the like; and a communication part 609 including a network interface card such as a LAN (Local Area Network) card, a modem, and the like. The communication part 609 performs communication processing via a network such as the Internet. The driver 610 is also connected to the I/O interface 605 as desired. The removable medium 611, such as a magnetic disk, an optical disc, a magneto-optical disc, a semiconductor memory, and the like, is mounted on the driver 610 as needed, so that the computer program read there from it is installed into the storage part 608 as desired.

In particular, the processes described below with reference to the flowchart may be implemented as computer software programs in accordance with embodiments of the present disclosure. For example, embodiments of the present disclosure include a computer program product including a computer program carried on a computer readable medium, the computer program including program code for performing the method shown in the flowchart. In such embodiments, the computer program may be downloaded and installed from the network via the communication part 609, and/or installed from the removable medium 611. When the computer program is executed by the central processing unit (CPU) 601, various functions defined in the system of the present disclosure are performed.

It should be noted that the computer-readable medium shown in the embodiments of the present disclosure may be a computer-readable signal medium or a computer-readable storage medium, or any combination of the above. A computer-readable storage medium may be, for example, but is not limited to, an electrical, magnetic, optical, electromagnetic, infrared, or semiconductor system, apparatus, or device, or any combination of them. More specific examples of computer-readable storage medium may include, but are not limited to, an electrical connection with one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical storage device, a magnetic storage device, or any suitable combination of them. In the present disclosure, a computer-readable storage medium may be any tangible medium that includes or stores a program that may be used by or in connection with an instruction execution system, apparatus, or device. In the present disclosure, a computer-readable signal medium may include a data signal propagated in a baseband or as part of a carrier, where the computer-readable program code is carried. Such propagated data signals may take a variety of forms, including, but not limited to, electromagnetic signals, optical signals, or any suitable combination of them. The computer-readable signal medium may also be any computer-readable medium other than a computer-readable storage medium, which may send, propagate, or transmit a program for use by or in connection with an instruction execution system, apparatus, or device. The program code contained on the computer-readable medium may be transmitted by any suitable medium, including but not limited to: wireless medium, wired medium, etc. or any suitable combination of the foregoing.

The flowchart and block diagrams in the drawings illustrate the architecture, functionality, and operation of possible implementations of systems, methods, and computer program products in accordance with various embodiments of the present disclosure. In this regard, each block in the flowchart or block diagrams may represent a module, program segment, or part of code, which includes one or more executable instructions for implementing the specified logical function. It should also be noted that, in some alternative implementations, the functions noted in the block may occur out of the order noted in the figures. For example, two blocks represented in succession may, in fact, be executed substantially in parallel, which may sometimes be executed in the reverse order, depending upon the functionality involved. It should also be noted that each block of the block diagrams or flowchart illustration, and combinations of blocks in the block diagrams or flowchart illustration may be implemented with dedicated hardware-based systems that perform the specified functions or operations, or may be implemented in combinations of special purpose hardware and computer instructions.

The units involved in the embodiments of the present disclosure may be implemented in a software manner, or may be implemented in a hardware manner, and the described units may also be disposed in a processor. Among them, the names of these units are in some cases and do not constitute a limitation on the unit itself.

In another aspect, the present disclosure further provides a computer-readable medium, and the computer-readable medium may be included in the electronic device described in the foregoing embodiments; or may exist alone, but is not assembled into the electronic device. The computer readable medium carries one or more programs, and when the one or more programs are executed by one electronic device, the electronic device implements the method described in the above embodiments.

It should be noted that although several modules or units of an apparatus for action execution are mentioned in the above detailed description, such division is not mandatory. Indeed, according to embodiments of the present disclosure, the features and functions of the two or more modules or units described above may be embodied in one module or unit. Conversely, the features and functions of one module or unit described above may be further divided into a plurality of modules or units.

Through the description of the above embodiments, a person skilled in the art would easily understand that the example implementations described here may be implemented by software, or may be implemented by software in combination with necessary hardware. Therefore, the technical solution according to the embodiments of the present disclosure may be embodied in the form of a software product, and the software product may be stored in a non-volatile storage medium (which may be a CD-ROM, a USB flash disk, a mobile hard disk, etc.) or on a network, an may include several instructions to enable a computing device (which may be a personal computer, a server, a touch terminal, or a network device, etc.) to perform the method according to the embodiments of the present disclosure.

Other embodiments of the present disclosure will be apparent to those skilled in the art from consideration of the specification and practice of the invention disclosed here. The present disclosure is intended to cover any variations, uses, or adaptations of the present disclosure following the general principles of the present disclosure and including common general knowledge or customary technical means in the art not disclosed in the present disclosure.

It should be understood that the present disclosure is not limited to the precise construction that has been described above and illustrated in the accompanying drawings, and that various modifications and changes may be made without departing from the scope of the present disclosure. It is intended that the scope of the present disclosure be limited by the appended claims.

What is claimed is:

1. A method for vehicle control, comprising:
   obtaining a slip ratio in a current control cycle of a vehicle;
   calculating a road friction coefficient in the current control cycle of the vehicle by invoking a corresponding calculation strategy according to the slip ratio; and
   controlling the vehicle in real time by inputting the road friction coefficient into a vehicle control optimization model to obtain a control instruction for the current control cycle of the vehicle;
   wherein, the invoking the corresponding calculation strategy according to the slip ratio comprises:
   determining a slip ratio interval where the slip ratio is located in, wherein the slip ratio interval is configured with a calculation strategy;
   in response to determining that the slip ratio is located in a first interval, invoking a first calculation strategy, comprising: obtaining a friction influence ratio of front and rear wheels; calculating a longitudinal force of a whole vehicle based on the friction influence ratio of the front and rear wheels and a coefficient between a slip slope and road friction; calculating the road friction coefficient based on the longitudinal force of the whole vehicle.

2. The method for vehicle control according to claim 1, wherein the calculating the road friction coefficient based on the longitudinal force of the whole vehicle comprises:
   determining a coefficient input value according to an invoked calculation strategy;
   obtaining a parameter for the current control cycle of the vehicle, and calculating an output value; and
   calculating a road friction parameter to be estimated by using a least square method with a forgetting factor according to the input value and the output value.

3. The method for vehicle control according to claim 1, wherein the method further comprises pre-constructing the vehicle control optimization model, comprising:
   configuring decision variables for the vehicle control optimization model, the decision variables comprising state variables and control variables; and
   constructing the vehicle control optimization model by establishing a loss function as an objective function and setting constraint conditions, wherein the constraint conditions are related to the road friction coefficient.

4. The method for vehicle control according to claim 3, wherein the state variables comprise a position coordinate, a heading angle, a longitudinal linear speed, a tire slip angle and a heading angular acceleration, and the control variables comprise a longitudinal force of a whole vehicle and a front wheel steering angle.

5. The method for vehicle control according to claim 3, wherein the constraint conditions comprise: a dynamic model constraint condition, a starting point constraint condition, a front wheel steering angle constraint condition, a front wheel steering angle increment constraint condition, a longitudinal force constraint condition, a longitudinal force increment constraint condition, a speed constraint condition and a speed increment constraint condition.

6. The method for vehicle control according to claim 5, wherein a predicted dynamic model equation of a state variable for a reference trajectory point of the vehicle is configured as the dynamic model constraint condition.

7. The method for vehicle control according to claim 5, wherein an initial value of a state variable at a starting point of the vehicle is configured as the starting point constraint condition.

8. The method for vehicle control according to claim 5, wherein a front wheel steering angle constraint value range determined based on a maximum transverse acceleration value of the vehicle, a vehicle wheelbase, a longitudinal linear speed, a maximum front wheel steering angle and a minimum front wheel steering angle, is configured as the front wheel steering angle constraint condition.

9. The method for vehicle control according to claim 5, wherein a front wheel steering angle increment constraint value range determined based on a maximum front wheel steering angle increment and a minimum front wheel steering angle increment of the vehicle, is configured as the front wheel steering angle increment constraint condition.

10. The method for vehicle control according to claim 5, wherein a longitudinal force constraint value range determined based on a maximum longitudinal force and a minimum longitudinal force of the vehicle, is configured as the longitudinal force constraint condition.

11. The method for vehicle control according to claim 5, wherein a longitudinal force increment constraint value range determined based on a maximum longitudinal force increment and a minimum longitudinal force increment of the vehicle, is configured as the longitudinal force increment constraint condition.

12. The method for vehicle control according to claim 5, wherein a speed constraint value range determined based on a maximum longitudinal linear speed and a minimum longitudinal linear speed of the vehicle, is configured as the speed constraint condition.

13. The method for vehicle control according to claim 5, wherein a speed constraint increment value range, determined based on a maximum longitudinal linear speed increment and a minimum longitudinal linear speed increment of the vehicle, is configured as the speed increment constraint condition.

14. The method for vehicle control according to claim 1, wherein the inputting the road friction coefficient into the vehicle control optimization model to obtain the control instruction for the current control cycle of the vehicle comprises:
  obtaining parameter values of state variables of the current control cycle and inputting the parameter values of the state variables into the vehicle control optimization model;
  updating the vehicle control optimization model based on the road friction coefficient;
  obtaining parameter values of control variables by solving based on an objective function and constraint conditions in the vehicle control optimization model; and
  generating the control instruction based on the parameter values of the control variables.

15. The method for vehicle control according to claim 1, wherein, the invoking the corresponding calculation strategy according to the slip ratio further comprises,
  in response to determining that the slip ratio is located in a second interval, invoking a second calculation strategy, comprising: calculating the longitudinal force of the whole vehicle normalized by the front and rear wheels; and calculating the road friction coefficient based on the longitudinal force of the whole vehicle.

16. A non-transitory computer-readable storage medium, storing with a computer program, wherein when the computer program is executed by a processor, a method for vehicle control is implemented, and the method comprises:
  obtaining a slip ratio in a current control cycle of a vehicle;
  calculating a road friction coefficient in the current control cycle of the vehicle by invoking a corresponding calculation strategy according to the slip ratio; and
  controlling the vehicle in real time by inputting the road friction coefficient into a vehicle control optimization model to obtain a control instruction for the current control cycle of the vehicle;
  wherein, the invoking the corresponding calculation strategy according to the slip ratio comprises:
  determining a slip ratio interval where the slip ratio is located in, wherein the slip ratio interval is configured with a calculation strategy;
  in response to determining that the slip ratio is located in a first interval, invoking a first calculation strategy, comprising: obtaining a friction influence ratio of front and rear wheels; calculating a longitudinal force of a whole vehicle based on the friction influence ratio of the front and rear wheels and a coefficient between a slip slope and road friction; calculating the road friction coefficient based on the longitudinal force of the whole vehicle.

17. An electronic device, comprising:
one or more processors; and
a storage device, configured to store one or more programs, wherein when the one or more programs are executed by the one or more processors, the one or more processors implement a method for vehicle control, comprising:
  obtaining a slip ratio in a current control cycle of a vehicle;
  calculating a road friction coefficient in the current control cycle of the vehicle by invoking a corresponding calculation strategy according to the slip ratio; and
  controlling the vehicle in real time by inputting the road friction coefficient into a vehicle control optimization model to obtain a control instruction for the current control cycle of the vehicle;
  wherein, the invoking the corresponding calculation strategy according to the slip ratio comprises:
  determining a slip ratio interval where the slip ratio is located in, wherein the slip ratio interval is configured with a calculation strategy;
  in response to determining that the slip ratio is located in a first interval, invoking a first calculation strategy, comprising: obtaining a friction influence ratio of front and rear wheels; calculating a longitudinal force of a whole vehicle based on the friction influence ratio of the front and rear wheels and a coefficient between a slip slope and road friction; calculating the road friction coefficient based on the longitudinal force of the whole vehicle.

18. The electronic device according to claim 17, wherein the calculating the road friction coefficient based on the longitudinal force of the whole vehicle comprises:
  determining a coefficient input value according to an invoked calculation strategy;
  obtaining a parameter for the current control cycle of the vehicle, and calculating an output value; and
  calculating a road friction parameter to be estimated by using a least square method with a forgetting factor according to the input value and the output value.

19. The electronic device according to claim 17, wherein the method further comprises pre-constructing the vehicle control optimization model, comprising:
  configuring decision variables for the vehicle control optimization model, the decision variables comprising state variables and control variables; and
  constructing the vehicle control optimization model by establishing a loss function as an objective function and setting constraint conditions, wherein the constraint conditions are related to the road friction coefficient.

20. The electronic device according to claim 17, wherein, the invoking the corresponding calculation strategy according to the slip ratio comprises:
  in response to determining that the slip ratio is located in a second interval, invoking a second calculation strategy, comprising: calculating the longitudinal force of the whole vehicle normalized by the front and rear wheels; and calculating the road friction coefficient based on the longitudinal force of the whole vehicle.

* * * * *